Dec. 17, 1957   J. W. ANDERSON   2,816,722
AUTOMATIC PILOTS
Filed Jan. 23, 1950   2 Sheets-Sheet 2

INVENTOR.
JOHN W. ANDERSON
BY George H Fisher
ATTORNEY

United States Patent Office 2,816,722
Patented Dec. 17, 1957

2,816,722

AUTOMATIC PILOTS

John W. Anderson, Edina, Minn., assignor to Minneapolis-Honeywell Regulator Company, Minneapolis, Minn., a corporation of Delaware Application January 23, 1950, Serial No. 140,035

22 Claims. (Cl. 244—77)

This invention pertains to steering mechanisms or automatic pilots for dirigible craft such as aircraft, water craft, and the like. The invention for purpose of illustration has been embodied in a type of automatic pilot wherein automatic directional control is obtained from a directional gyroscope which is slaved to a magnetic compass by suitable precessing means.

It is an object of this invention to provide novel means operative so that during the setting up of said slaved relationship between the compass and gyroscope a higher precession rate for said gyroscope is available than is available after the gyroscope and compass have been aligned.

It is a further object of this invention to establish an interval during which the high precession rate may be exerted to effect alignment between the compass and gyroscope prior to the imposition of said automatic directional control of said craft by said gyroscope.

It is a further object of this invention to include a control signal pick-off effective upon relative displacement of the craft and gyroscope for governing said directional control with further means controlled by said pick-off for removing the effect of said relative displacement prior to the imposition of automatic directional control.

It is a further object of this invention to provide a selective manually operable course changer effective to operate through said gyroscope. The course changer additionally includes means to prevent the imposition of automatic directional control initially until said manual course changer is in a normal position.

It is a further object of this invention to provide an improved arrangement wherein automatic control of said aircraft may be imposed despite any non-level attitude of said craft with said non-level attitude being thereafter maintained. In this arrangement, selective devices may be subsequently operated to return the craft to a preset attitude differing from said non-level attitude. While the craft proceeds to such preset attitude, the gyroscope pick-off is momentarily associated with the means for removing any effect therein due to relative displacement of said craft and gyroscope. Additionally the manually operable course changer is rendered ineffective in the operations to return the craft to a preset attitude.

These and further objects of the invention will be more fully brought out on reference to the accompanying description and drawing disclosing one embodiment of the invention.

The invention by way of illustration is shown in the accompanying drawing wherein.

Figure 1:
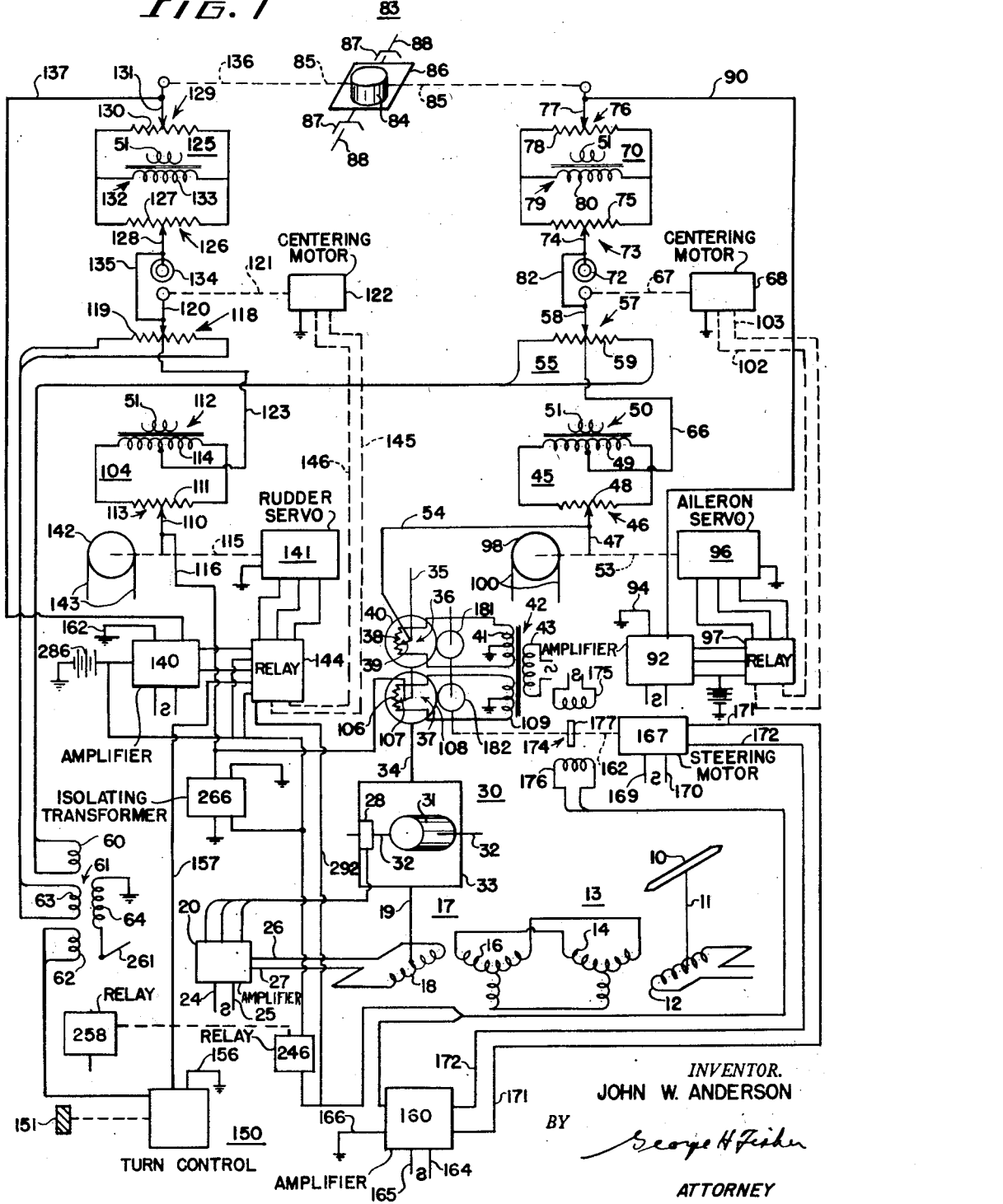
Figure 1 is a schematic arrangement of the automatic pilot.

Referring to Figure 1, a magnetic compass which is affected by the earth's magnetic field is shown by way of example as a magnetic needle 10. The needle 10 through a spindle 11 positions a single phase winding 12 of a synchro transmitter 13. The single phase winding 12 is energized from a suitable source of alternating current. The transmitter 13 includes a three winding stator 14 which is relatively fixed to the craft. The winding 14 has triple voltages induced in its windings which voltages correspond to the relative positions of the winding 12 with respect to the winding 14. The windings of stator 14 are connected to the corresponding polyphase windings of a stator 16 of a signal transformer 17. A single phase winding 18 of signal transformer 17 is carried on a vertical spindle 19. The single phase winding 18 of transformer 17 is connected to a precession motor amplifier 20.

The precession motor amplifier 20 is of the well known A. C. discriminator type. The amplifier 20 is connected to the suitable source of alternating current. The amplifier 20 includes relays 21, 22, Figure 2, which are alternatively operated depending upon the phase relationship between the voltage across the leads 24, 25 connected to the alternating current source and that across signal input leads 26, 27 connected to the phase winding 18 of transformer 17. A suitable type of amplifier is disclosed in a patent to W. H. Gille et al., No. 2,425,734.

Figure 2:
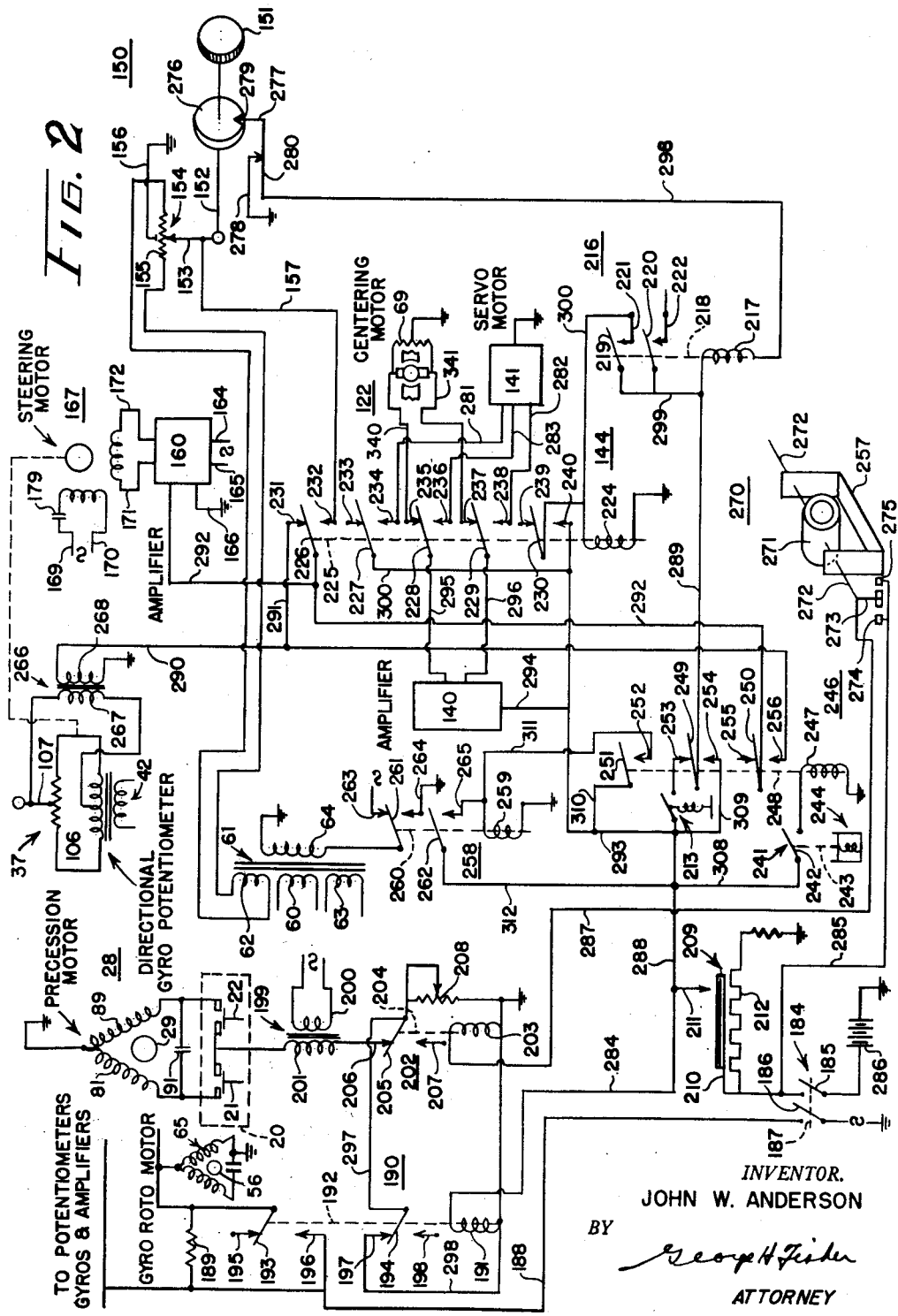
Figure 2 is a schematic diagram of certain specific portions of the automatic pilot the details whereof being intimately associated with the invention.

The amplifier 20 controls the operation of a directional gyroscope precession motor 28. The precession motor 28 (as shown in Figure 2) may be an induction motor of the split phase capacitor type having a rotor 29 and field windings 81, 89. A common junction of one of each winding 81 and 89 is connected to ground or as in the middle wire in Figure 1 has a common return. The opposite end of winding 81 is connected to one contact of single pole single throw double make relay 21 in amplifier 20. The opposite end of winding 89 is connected to one contact of single pole single throw double make relay 22 in amplifier 20. A condenser 91 is connected across the ends of winding 81, 89 adjacent the relay contacts. The rotor 29 is inductively associated with windings 81 and 89 and the direction of the induced torque tending to turn the rotor 29 depends upon which relay 21 or 22 is operated.

A slaved directional gyroscope 30, Figure 1, includes a casing 31 in which is supported for rotation about a horizontal axis an electrical motor driven rotor 56, Fig. 2. The rotor motor 65 may be of any suitable type such as a split phase capacitor type induction motor. The rotor casing 31 is carried by trunnions 32 on a horizontal axis in a vertical gimbal ring 33. The vertical gimbal ring 33 is rotatable about a vertical axis 34. Spindle 19 of the signal transformer 17 is aligned with the gimbal axis 34 and is supported from the vertical ring 33 of the gyroscope 30. The rotor 29 of precession motor 28 may be carried on the trunnions 32 of casing 31. The stator windings 81, 89 of the precession motor 28 may be supported by the vertical gimbal ring 33 and the torque tending to rotate the rotor 29 and thus the trunnion 32 causes the gyroscope to precess about the axis 34 thereby carrying with it the single phase winding 18 of transformer 17.

Automatic directional control stems from a directional gyro aileron pick-off 36 and a directional gyro rudder pick-off 37 which separately form part of a two channel automatic pilot for controlling the ailerons and rudder. Directional gyro aileron pick-off 36 of the aileron channel is a component of a balanceable network which additionally includes rebalancing potentiometer 45, a trim or centering potentiometer 55, and a variable impedance network 70. The balanceable network controls an aileron servo amplifier 92.

Pick-off or potentiometer 36 includes a circular segmental resistor 38 which is carried by a gear 40 but in insulated relation therefrom. The gear 40 is freely rotatable about the axis of a spindle 35 which is in line with the axis 34 of gimbal 33. The pick-off 36 includes a slider 39 which contacts the resistor 38 and the slider 39 is mounted on the spindle 35 which in turn is supported by the vertical gimbal ring 33. The resistor 38 is connected across the ends of a secondary winding 41 of a transformer 42. A center tap of secondary winding 41 is connected to ground. The transformer 42 includes a primary winding 43 which is connected to the source of alternating current.

The rebalancing network 45 consists of a rebalancing potentiometer 46 having a slider 47 and a resistor 48 which is connected across the ends of a secondary winding 49 of a transformer 50. The transformer 50 has a primary winding 51 connected to the alternating current source. The slider 47 is operatively driven from a shaft 53 extending from an aileron servomotor 96 to be described. A lead wire 54 extends from the slider 39 of the directional gyro aileron potentiometer to the slider 47 of the rebalancing potentiometer.

The trim or centering network 55 includes a centering potentiometer 57 having a slider 58 and a resistor 59 which is connected across the ends of a secondary winding 60 of a transformer 61 (Figure 1). A lead wire 66 extends from a center tap of secondary winding 49 to a center tap of resistor 59. The slider 58 is operatively connected to a shaft 67 extending from a centering motor 68. The centering motor 68 like centering motor 122, to be referred to may be of the direct current armature permanent magnet field type. The armature brushes of both motors 68 and 122 are shunted by a center tapped resistor 69, Figure 2, whose center tap is connected to ground. The resistor 69 provides for reverse rotation of motor 68.

The impedance network 70 consists of an automatic recovery potentiometer 73, a vertical gyro roll axis potentiometer 77, and a transformer 79. Potentiometer 73 consists of a slider 74 and a resistor 75 which is connected across the ends of a secondary winding 80 of transformer 79. The slider 74 is manually adjustable from a control knob 72. A lead 82 extends from the slider 58 of a centering potentiometer 57 to the slider 74 of the auto recovery potentiometer 73. Potentiometer 76 consists of a slider 77 and a resistor 78 which is connected across a secondary winding 80 in parallel with resistor 75. Transformer 79 includes a primary winding 51 identical with the primary winding 51 of the rebalancing network 45. This arrangement is provided since a single primary winding may have several secondary windings. The slider 77 is operated by a vertical gyroscope 83.

The vertical gyroscope 83 may be of the type well known in the art having a casing 84 within which is mounted an electrically motor driven rotor (not shown) for rotation about a vertical axis. The casing 84 is carried in an outer gimbal ring 86 upon trunnions 85, 85. The gimbal ring 86 is in turn being carried by trunnions 88, 88 in pedestal bearings 87, 87. The axis of trunnions 88 is in a horizontal plane and at right angles to the axis of trunnions 85. The gyroscope 83 is so arranged in the craft that upon tilt of the craft about the roll axis slider 77 is moved with respect to resistor 78 in a direction and in proportion to the magnitude of a displacement of the craft about its roll axis.

A lead wire 90 extends from slider 77 to amplifier 92 where it is connected to a control electrode therein. A lead wire 94 extending from another control electrode of amplifier 92 is connected to ground and is therefore common with the grounded center tap of secondary winding 41 of transformer 42. It is apparent therefore that a complete control circuit has now been traced for the amplifier 92. The amplifier 92 has power leads connected to the alternating current source.

The amplifier 92 is of the A. C. discriminator type and may be similar to that shown in Patent 2,425,734 dated August 19, 1947.

An aileron servomotor 96 drives through its operating shaft 53 a cable drum 98 from which extend cables 100. The cables 100 are connected to the cables extending from the manually operable control column (not shown) of the aircraft. The aileron servomotor 96 may be of the type disclosed in the aforesaid Patent 2,425,734. The amplifier 92 reversibly controls the aileron servomotor 96 or the centering motor 68 alternatively depending upon the operation of the aileron engage relay 97 in a manner more fully to be described. In order to illustrate this alternative operation leads 102, 103 extending from the centering motor to the aileron engage relay 97 have been illustrated in broken line.

The directional gyro rudder pick-off 37 of the rudder channel forms part of a balanceable circuit which additionally includes rudder servo rebalancing potentiometer 104, a rudder trim potentiometer 118, and a variable impedance network 125. The pick-off or potentiometer 37 includes a slider 107 and a resistor 106. The resistor is carried by a gear 108 in insulated relation therefrom. The gear 108 is freely rotatable about the axis of spindle 34. The slider 107 of potentiometer 37 is carried by the spindle 35 which is affixed to gimbal ring 33 of the directional gyro 30. The ends of the resistor 106 are connected to the corresponding ends of a secondary winding 109 of transformer 42. The secondary winding 109 has a grounded center tap.

The rebalancing network 104 includes a rebalancing potentiometer 113 having a resistor 111 and a slider 110. The resistor 111 is connected across the ends of a secondary winding 114 of a transformer 112 having a primary winding 51. The slider 110 is carried by a servomotor shaft 115. A lead wire 116 extends from the slider 107 of the directional gyro rudder potentiometer 37 to the slider 110 of the rebalancing potentiometer 113.

The rudder trim potentiometer 118 consists of a slider 120 and a resistor 119 which resistor is connected across the ends of a secondary winding 63, Figure 2, of a transformer 61. The slider 120 is carried by a shaft 121 operatively driven from a centering motor 122 similar to the aileron centering motor 68. A lead wire 123 extends from a center tap of secondary winding 114 to a center tap of resistor 119.

The variable impedance network 125 includes an automatic recovery potentiometer 126 consisting of a resistor 127 and a slider 128; a vertical gyro rudder potentiometer 129 consisting of a slider 131 and a resistor 130; and a transformer 132 having a primary winding 51 and a secondary winding 133. The resistors 127 and 130 are connected in parallel across the ends of secondary winding 133. Slider 128 of the automatic recovery potentiometer 126 is manually adjustable by a control knob 134. A lead 135 extends from the slider 120 of the trim potentiometer to the slider 128. Slider 131 is driven by an operative connection 136 carried by trunnion 85 of the vertical gyro 83. The slider 131 moves with respect to resistor 130 upon movement of the craft about the roll axis. A lead wire 137 extends from slider 131 to one control element in rudder servomotor amplifier 140. A lead wire 162 extends from another control element in amplifier 140 to ground and is therefore common to the grounded center tap of secondary winding 109. Control signals are applied between the lead wires 137 and 162 to control the operation of amplifier 140. The amplifier 140 is also connected to the source of alternating current and is thus similar to the aileron amplifier 92.

A rudder servomotor 141 through its shaft 115 drives a cable drum 142. Cables 143 extend from the cable drum 142 and are secured to the main operating cables of the rudder (not shown). The rudder amplifier 140 reversibly controls rudder servomotor 141 or alternatively controls centering motor 122 through a rudder engage relay 144. This alternative control is represented by the broken lines 145, 146 representing lead wires extending from the rudder engage relay 144 to the centering motor 122.

A turn control or course changer 150 is provided to make selective changes in heading of the craft. The course changer 150 includes a manually operable knob 151 which through its shaft 152 operates a slider 153 of a potentiometer 154. A resistor 155 of potentiometer 154 is connected across the ends of secondary winding 62 of transformer 61 (Figure 2). A lead wire 156 extends from a center tap of resistor 155 to ground. An output lead wire 157 from the course change potentiometer 154 extends through the rudder engage relay 144 to the input circuit of a steering motor amplifier 160. Included in this signal input circuit of amplifier 160 is a velocity generator 174 to be described. The portion of the signal input control circuit of amplifier 160 mentioned above is connected to one control electrode of amplifier 160. Another control electrode of amplifier 160 is connected by a lead wire 166 to ground and thence to the grounded lead 156 of potentiometer 154. The amplifier 160 is connected to the alternating current power source through lead wires 164, 165.

The amplifier 160 controls the rotation of a steering motor 167. The steering motor may be a single phase induction motor of the capacitor type having one phase winding connected in series with a condenser 179 to the alternating current power source through leads 169 and 170. The other phase winding is connected by lead wires 171 and 172 to the output of amplifier 160. The direction of rotation of the steering motor 167 thus depends upon the phase relationship between the voltage across the power lead wires 164, 165 of amplifier 160 and that across the amplifier signal input terminal connections. The amplifier-steering motor combination may be similar to that in application Serial No. 22,841, filed April 23, 1948.

The steering motor 167 through its shaft 162 drives a velocity generator 174. This velocity generator consists of a primary winding 175, a secondary winding 176, and a rotor 177. For purpose of illustration the windings 175 and 176 have been rotated through 90° from a plane perpendicular to the plane of the drawing; additionally winding 175 has been rotated circumferentially 90° from its normal position about the periphery of rotor 177. The primary winding 175 is connected to the alternating current source and the secondary winding 176 is inductively related to the primary winding 175 upon rotation of the rotor 177.

The steering motor 167 through its shaft 162 also rotates the gears 181 and 182 which are the driving gears for gears 40 and 108 that support the potentiometer resistor 38 and 106, respectively, to provide changes in heading of the craft in a manner more fully to be described.

An aircraft provided with an automatic pilot of the type embodying this invention may have its control surfaces directly manually operated from the conventional control column and rudder bar; may have its control surfaces automatically controlled for the purpose of stabilized flight; or may have its control surfaces manually controlled through the automatic pilot to obtain changes in heading of the craft. Figure 2 shows in detail the operative relationship between the components of the automatic pilot in accordance with the three various operations to be obtained. An automatic pilot which includes electrically driven gyroscopes and electrical types of pick-off devices must have these components connected to a source of electrical energy. In the present embodiment, this connection is provided by a main automatic pilot switch 184. Switch 184 is of the two pole single throw single make type having poles 185 and 186 operated together by a common actuator 187. Poles 185 and 186 of switch 184 control the D. C. and A. C. sections of the automatic pilot. While the A. C. section consisting of the various potentiometer transformers, gyroscope rotors, and amplifiers are directly fed from the alternating current source through pole 186, yet specifically the directional gyro rotor circuit is controlled by a rotor speed relay 190. Relay 190 is of the two pole double throw single make type. The relay 190 consists of an operating coil 191 which through its plunger 192 serves as an actuating means for the two poles, 193, 194. Pole 193 operates between an out contact 195 and an in contact 196. Pole 194 operates between an out contact 197 and an in contact 198.

Reverting to the precession motor 28, it is energized from a transformer 199. The precession motor transformer 199 consists of a primary winding 200 and a secondary winding 201. One end of secondary winding 201 is connected through amplifier 20 to the precession motor 28. The other end of secondary winding 201 is connected into the precession motor circuit through a craft turn responsive relay 202. The relay 202 is of a single pole double throw single make type, having an actuating coil 203 which through a plunger 204 operates the pole 205 between out contact 206 and in contact 207. A variable resistor 285 is connected across pole 205 and ground.

A time delay device 209 is associated with relay coil 191 to provide initial rapid alignment of the gyroscope with the compass prior to the time when the automatic pilot may be associated with the control surfaces of the craft. The time delay device consists of a single pole single throw single make switch having a pole 210 and an in contact 211. The pole 210 is of bimetal construction and is heated from an element 212 adjacent thereto.

The time delay switch 209 also controls the effectiveness of a main autopilot engage switch 213. This main engage switch is of a single pole, single throw, normally open, temporary closed type and is manually operable.

Associated with the main engage switch 213 is a main engage relay 216 which is of the double pole single throw single make type. The relay 216 consists of an operating coil 217 which through its plunger 218 operates the poles 219 and 220 which are associated respectively with in contacts 221 and 222. The contact 221 is designated the rudder engage relay energizing contact and the contact 222 is designated the aileron engage relay energizing contact.

Associated with the contact 221 is a rudder engage relay 144. The rudder engage relay 144 is of the five pole double throw single make type having an operating coil 224 which through a plunger 225 operates the poles or contact arms 226, 227, 228, 229, and 230. Arm 226 operates between out contact 231 and in contact 232; arm 227 operates between out contact 233 and in contact 234; arm 228 operates between out contact 235 and in contact 236; arm 229 operates between out contact 237 and in contact 238; arm 230 operates between out contact 239 and in contact 240. The relay arms are biased toward the out position by spring means (not shown).

While the main engage relay 216 is controlled by the main engage switch 219 it is alternatively controlled through an automatic recovery switch 241 and an automatic recovery relay 246. The switch 241 is of the single pole single throw single make normally open type. The switch 241 has a pole or contact arm 242 which is associated with a dash pot spring arrangement 244 through a dash pot plunger 243. When the switch 241 is closed and released the dash pot through its spring moves the pole 242 to open position a short time after it is adjusted to the closed position the opening time being in a nature of approximately seven seconds. Such dash pot devices are well known in the art and the period required to open the switch depends merely upon the proper selection of the dash pot and spring arrangement 244.

The relay 246 is of the three pole double throw single make type. Relay 246 includes an operating coil 247 which through its plunger 248 operates the pole or relay arms 249, 250 and 251. Arm 251 coacts with an in contact 252; arm 249 coacts with an out contact 253 and an in contact 254; arm 250 coacts with an out contact 255 and an in contact 256. Contact 252 of the auto recovery relay 246 is associated with a locking relay 258. Relay 258 is of the two pole double throw single make type which through its operating coil 259 and plunger 260 actuates the pole or relay arms 261 and 262. The arm 261 coacts with an out contact 263 and an in contact 264; arm 262 coacts with an in contact 265. Switch arm 261 of locking relay 258 controls the energization or deenergization of a primary winding 64 of transformer 61 which supplies the centering and turn potentiometer secondary windings.

During the operation of the aircraft when the automatic pilot is not being utilized such as when the control surfaces are being manually operated directly, the craft may undergo a change in heading which would result in a relative rotation or displacement of the aircraft with respect to the directional gyroscope. This would result in a relative displacement of the gyro stabilized slider 107 of potentiometer 37 with respect to its resistor 106 normally fixed with respect to the craft but rotatable with respect thereto by means to be described. Should it be desired while such relative displacement of gyroscope and craft exists to effect automatic pilot control of the craft it is clear that a residual signal will have been generated which will cause a lurch of the craft upon the imposition of such automatic pilot control. For this purpose, it is desired to maintain the potentiometer 37 in a no signal position while the automatic pilot is not utilized and to this end any voltage generated at pick-off or potentiometer 37 is applied to a primary winding 267, Figure 2, of an isolating transformer 266. The voltage induced in the secondary winding 268 of transformer 266 is subsequently utilized in a manner to be described to drive the pick-off 37 to a normal or no signal position.

Under ordinary straight or level flight the slaved relationship between the magnetic compass and the gyroscope 30 may be maintained. However, it has been found in banked turns that it is desirable to sever this slaved relationship between the magnetic compass and gyroscope and this severing is controlled by a turn indicator or rate of turn gyroscope 270. The manner in which this severence is obtained will be more fully set out in the statement of operation of the arrangement. The rate of turn gyroscope 270 is of the type whose rotor has two angular degrees of freedom and includes a gyroscope casing 271 which supports a rotor for rotation about a horizontal axis. The casing 271 is carried by trunnions 272 in a channel shaped bracket 257. The gyroscope 270 is so arranged in the craft that upon movement of the craft about the vertical or turn axis the gyroscope will precess about the axis of trunnions 272. Spring means (not shown) serve to restore the casing 271 to its horizontal position when rotation of the craft about the vertical axis ceases. One trunion 272 carries a contact arm 273 which is between spaced contacts 274, 275 and coacts therewith in a manner to become evident.

It was stated above that during manual operation of the control surfaces where heading changes are undergone the potentiometer 37 is maintained in a null or no signal condition preparatory or in anticipation of automatic pilot control being imposed. In order to avoid any inadvertent signal from the course changer 150 while the automatic pilot control is introduced, an arrangement has been provided whereby automatic pilot control can be introduced only after the manually operable knob 151 of the course changer 150 has been placed in a normal position. This arrangement is controlled by a disc 276 carried by the shaft 152 operated by the course change knob 151. The disc 276 has a radial notch 279. A follower 277 of a switch arm 280 bears on the periphery of disc 276. The arm 280 coacts with a fixed contact 278 in normal position of the knob 151 when follower 277 rests in notch 279.

Operation

Before proceeding with the statement of operation of the arrangement it may be desirable to dwell briefly on the operation of the control surface servomotors utilized in the arrangement. Such servomotors have been disclosed in the aforesaid patent to Willis H. Gille et al. and in the application of Willis H. Gille, Serial No. 447,989, now Patent No. 2,750,602. These servomotors are of such construction that the control surfaces may be manually operated without resistance thereto by the servomotor. The rudder servomotor 141, Figure 2, may be associated with its control surface upon the energization of lead wire 281 at which time such servomotor will hold the control surface in a braked condition. If either lead wires 282 or 283 are subsequently energized, the braked condition is overcome and the servomotor 141 rotates in one or the other directions depending upon which lead 282 or 283 is energized. When either lead wire 282 or 283 is subsequently deenergized the braked condition is again imposed.

The operation will be considered from the time when the automatic pilot is "started up" and initially concerns slaving the gyroscope to the compass. This starting is initiated by closing the master switch 184. In the A. C. section controlled by pole 186 of switch 184, voltages are fed from the A. C. source through bus 188 to the potentiometer transformers, amplifiers, and gyro circuits other than the directional gyro rotor circuit. The directional gyroscope rotor motor 65 is fed initially from the A. C. bus 188 through a resistor 189 to reduce the available voltage on the rotor motor and therefore to initially hold down its speed of rotation. The single phase winding 12 of synchro 13 is now energized and if the compass 10 and the gyroscope 30 are not aligned a voltage will be induced in the single phase winding 18 of signal transformer 17, and this signal will be applied across the lead wires 26, 27 connected to the precession motor amplifier 20. The precession motor 28 will be operated by the amplifier 20 to apply a torque about the axis of trunnions 32 resulting in the precession of the directional gyro about the axis 34 until the single phase winding 18 of transformer 17 is positioned to a null. At this time the secondary winding 201 of transformer 199, Figure 2, which energizes the precession motor 28 through amplifier 20 additionally has its circuit completed at its lower end as shown in Figure 2 throughout contact 206 and pole 205 of relay 202, lead 297, pole 194 of relay 190, out contact 197, lead 298 to ground. Thus the full voltage of secondary winding 201 is applied to the precession motor 28 at this time.

The D. C. circuit which is controlled by pole 185 of switch 184 is extended from battery 286 through the heating element 212 of switch 209 and thence to battery ground. After a time interval the bimetal 210 closes a circuit with contact 211 thereby extending D. C. voltage to coil 191 by way of lead wire 284. The circuit through the coil 191 is completed to ground through the lead wire 298.

The relay 190 now pulls in causing the relay arm 193 to engage the in contact 196 which thereby causes the A. C. source to shunt the resistor 189 thus applying full available voltage on the directional gyro rotor motor.

The closing of relay 190 causes the relay arm 194 to break the precession motor circuit between lead wire 297 and out contact 197. The precession motor circuit now extends from the relay arm 205 of relay 202 through the adjustable resistor 208 to ground. The resistor being added to the circuit of the precession motor reduces the available voltage thereof and thus reduces the torque which the motor may apply and thereby reduces the available precession rate for the directional gyro. It is presumed that the time delay and the operation of switch 209 is sufficient to bring the gyroscope in alignment with the compass and after such alignment is attained a lower rate of precession of the gyroscope is desired in order to avoid increasing its sensitivity to such a point that hunting would occur during oscillations of the magnetic compass.

When the aircraft turns, the rate of turn gyroscope 270 responds to this turning action and precesses about the axis of trunnions 272 to close a circuit operating relay 202 from battery 286, switch arm 185, lead 285, contact 274 or 275, switch arm 273, lead 287, operating coil 203 of relay 202 to ground. Relay 202 pulls in and breaks the circuit of the precession motor between out contact 206 and switch or relay arm 205. Thus the gyroscope may not be precessed during turning of the craft. When the rate of turn of the craft ceases, the arm 273 is automatically moved to mid-position between contacts 274 and 275 to break the circuit through the relay coil 203 and permit the relay arm 205 to move into engagement with its out contact 206 to permit the precession motor to function.

If the aircraft is being controlled in flight by direct manual operation of the control surfaces, the gyro stabilized sliders 107 and 39 of the directional gyro rudder and aileron potentiometers 37 and 36 momentarily may not be at the centers of their respective resistors 106 and 38 thereby setting up a signal in these pick-offs. Any such existing signal in the rudder pick-off 37, Figure 2, is applied across the isolating transformer 266, primary winding 267 and through transformer action to secondary winding 268, thence to lead 290, branch lead wire 291 to out contact 231 of the rudder engage relay 223, relay arm 226, lead wire 292, to amplifier 160, to one control electrode thereof, and from the other grounded control electrode to the grounded side of secondary winding 268. The steering motor amplifier 160 causes the steering motor 167 to rotate which through its shaft 162 rotates the drive gears 182 and 181 to position driven gears 108 and 40 until the pick-up 37 is in the no signal position. Thus the pick-off is maintained in a no signal condition.

The aircraft may angularly move about its roll axis during manual control surface operation causing the vertical gyroscope 83 to position the sliders 131 of the vertical gyro rudder potentiometer 129 and the slider 77 of the vertical gyro aileron potentiometer 76. The input circuit of the rudder amplifier 140 and the input circuit of the aileron amplifier 92 would thereby become unbalanced resulting in the operation of these amplifiers. With respect to the rudder amplifier 140 it operates one or the other of its two relays depending upon the phase relationship between the signal across its control electrodes of that from the alternating current source. Direct current is fed from main lead 288, subleads 293, 294 to amplifier 140, and, alternatively, depending upon which relay in the amplifier has been operated, through an operated relay in amplifier 140 to lead 295, relay arm 228, out contact 235, lead 340, through centering motor 122 to ground or through the other relay in amplifier 140, lead 296, relay arm 229, out contact 237, lead wire 341, through the centering motor 122 in the opposite direction to ground and to the ground of battery 286. The centering motor 122 through its shaft 121, Figure 1, positions the slider 120 of the trim or centering potentiometer 118 with respect to the resistor 119 to generate a voltage between the slider 120 and the center tap of resistor 119 which is equal and opposite to that between the vertical gyro operated slider 131 and the slider 128 of the automatic recovery potentiometer 126. Thus the input circuit of the rudder amplifier 140 is maintained in a balanced condition by the operation of the centering motor 122 while the control surfaces are being manually operated. In a similar manner, the aileron centering motor 68 maintains the input circuit of aileron amplifier 92 in a balanced condition while manual operation of the control surface is being exercised.

If it be desired, automatic pilot control may be introduced by the operation of the main engage switch 213 which upon closing completes a circuit from main lead 288, main engage switch 213, out contact 253 of the relay 246, switch arm 249 of the relay, lead 289, operating coil 217 of the main engage relay, lead 298, switch arm 280, contact 278 to ground, and to the ground of battery 286. When coil 217 is energized the main engage relay 216 pulls in and completes a circuit from lead 289, branch lead 299, arm 219 of relay 216, in contact 221, lead 300, operating coil 224 of the rudder engage relay 144, to ground and to the ground of battery 286.

As the rudder engage relay 144 pulls in the association between the isolating transformer secondary 268 and the steering motor amplifier 160 is broken between the relay arm 226 and the out contact 231 thus the directional gyro rudder pick-off 37 is no longer maintained in a null condition. The steering motor amplifier 160 is now associated through the arm 226, in contact 232, lead 157 with the course change potentiometer 154. The servomotor brake lead 281 is associated through the in contact 234, arm 227, lead 300, with the D. C. energized lead 293 thus causing the rudder control surface to be placed in a locked or braked condition by the servomotor 141. The rudder amplifier relay output lead 295 is now associated through arm 228, in contact 236, with one clutch lead 283 of servomotor 141 and the other amplifier relay output lead 296 is associated through arm 229, in contact 238 with the other clutch lead 282 of servomotor 141.

In a similar manner, the operation of the main engage relay 216 in causing arm 220 to engage the in contact 222 operates the aileron engage relay (not shown) to thus cause the aileron servomotor 96 to assume a braked condition with respect to the aileron control surfaces and to associate the aileron amplifier relay output leads with the aileron servomotor 96.

The aircraft is now under automatic pilot control. If such control be introduced when the aircraft is in a desired direction of heading such heading will be maintained. If the craft deviates from such heading, the directional gyro rudder potentiometer resistor 106 and the directional gyro aileron potentiometer resistor 38 would be rotated or carried by the craft with respect to their gyro stabilized sliders 107 and 39 resulting in a signal being generated or derived from the pick-offs 37 and 36. The rudder amplifier 140 and the aileron amplifier 92 in response to these signals caused by deviation of the craft will operate the rudder servomotor 141 and the aileron servomotor 96 resulting in a bank and turning of the craft toward the desired heading. The aileron and rudder servomotors also position their respective sliders 47 and 110 to rebalance each network. In response to the banking and turning of the craft, the vertical gyro adjusts the sliders 131 and 77 of potentiometers 129 and 76 putting in a reverse signal in the aileron and rudder bridge networks from that resulting from the initial deviation of the craft. In response to the reverse signal, from the operation of the vertical gyro, the control surfaces, namely the rudder and aileron, move back to their normal positions. As the craft approaches its desired heading, the signal from the pick-offs 36 and 37 decreases resulting in an unbalance in the aileron and rudder bridge networks. There is thus a further preponderant reverse signal in the aileron and bridge networks respectively which cause the servomotors for the rudder and aileron to move their control surfaces in an opposite direction from that in which they were moved following the initial deviation.

In response to this opposite positioning of the control surfaces, the back of the aircraft decreases and sliders 131 and 77 are moved back toward their normal positions by gyro 83. This adjustment of the vertical gyro sliders 131 and 77 again causes the movement of the control surfaces back toward normal. When the craft reaches its desired heading, the control surfaces are again in the same position as when the craft initially deviated.

If changes in heading of the aircraft through the automatic pilot control be desired, the knob 151 is rotated in the direction depending upon which direction the heading is to be altered. The knob 151 when displaced moves the slider 153 of potentiometer 154 with respect to its resistor 155 to generate a signal which is applied from slider 153, lead wire 157, in contact 232, relay arm 226, lead 292, to a control electrode of the steering motor amplifier 160. The other portion of the control circuit of amplifier 160 extends from the grounded electrode of amplifier 160 to the ground lead 156 of potentiometer 154. The steering motor 167, as controlled by the amplifier 160, through its drive gears 181 and 182 drives the gears 40 and 108 which support the potentiometer resistors 38 and 106.

The steering motor 167 also drives the rotor 177 of the velocity signal generator 174. The steering motor requires a minimum signal on the amplifier in order to obtain sufficient torque to overcome friction in the parts driven by the motor. The excess of the signal from potentiometer 154 over that minimum signal permits the velocity of the steering motor to increase. The increase in the velocity of steering motor is reflected in an increase velocity signal in the winding 176 of velocity generator 174. The speed of the steering motor is permitted to increase until the velocity signal generator winding 176 has induced therein a signal equal to the excess of the potentiometer signal over the minimum signal required to drive the steering motor. The rate at which the steering motor rotates therefore depends upon the amount of signal obtained from the potentiometer 154 and it is thus seen that the steering motor may be operated at selective variable rates.

As the steering motor through its driving gears 181 and 182 drives the resistors of potentiometers 36 and 37 there is a relative displacement of these resistors with respect to their sliders 39 and 107. A signal is thereby generated in the pick-ups 36 and 37 which is applied respectively to the aileron and rudder bridge networks to unbalance the same. The aileron and rudder amplifiers operate their control surfaces through their servomotors and the plane is thereby placed in a banked turn. In response to this bank of the craft the vertical gyro operates the sliders 131 and 77 to introduce a signal in the rudder and aileron bridges which tends to move the control surfaces back toward normal position. At this time the rudder and aileron bridge networks are balanced by the vertical gyro signals from potentiometers 76 and 129 offsetting the directional gyro signals or course change signals from potentiometers 36 and 37.

When it is no longer desired to continue in the banked turn the knob 151 is moved back to a normal position returning the slider 153 to the center tap of resistor 155. The steering motor 167 no longer rotates and the resistors 38 and 106 may be said to be relatively fixed to the craft at this time. As the craft in its banked attitude continues to turn, the resistors 38 and 106 move under their sliders 39 and 107 to reduce the signal from the pick-ups 36 and 37 in the aileron and rudder bridges. There is now a preponderance of vertical gyro signal which results in the opposite positioning of the ailerons and rudder thereby decreasing the banked attitude of the craft. This decrease in the banked attitude results in the reverse movement of slider 77 and 131 by the vertical gyro 83 with the control surfaces consequently being moved back toward their normal position. The action is continuous in that as the signals from the directional gyro rudder and aileron potentiometers 37 and 36 decrease an opposite control surface displacement is applied to the rudder and ailerons from that initially given to go into the bank turn. The resulting lessening in the amount of the bank is felt by the vertical gyro which unbalances the aileron and rudder amplifier networks to cause the control surfaces to be moved back toward normal. When the directional gyro rudder and aileron signals are removed, the craft attains the attitude previously had when course change was initiated. The craft is now stabilized on the new heading attained.

The operation of the automatic recovery feature will now be considered. It was previously stated, that while the aircraft control surfaces were being manually operated while in flight that the centering motors 122 and 68 for the rudder and aileron bridges were controlled by the respective amplifiers 140 and 92 to maintain the rudder and aileron amplifier bridge networks in a balanced condition despite changes in attitude of the craft. Thus the automatic pilot might be engaged with the control surfaces while the craft is in other than normal level flight attitude. Since the automatic pilot may be engaged in other than normal level flight attitudes of the craft, it appears desirable to provide some means for automatically returning the craft to normal flight attitude upon the automatic pilot taking control. This feature is especially desirable during emergencies. For this purpose the rudder bridge is provided with an automatic recovery potentiometer 126 and the aileron bridge is provided with an automatic recovery potentiometer 73. If the effect of the centering or trim potentiometer 118 be removed in the rudder bridge network, it is apparent that during manual operation the control voltage is dependent upon the relative positions of the sliders 131 and 128. Similarly in the aileron network with the effect of the trim potentiometer 57 removed any unbalance voltage in the aileron bridge network upon change in attitude of the craft depends upon the relative displacement of the sliders 77, and 74 if the craft changes attitude while being manually controlled. In this consideration, the effects of the servo balance potentiometers 113 and 46 is omitted for simplification since these control surfaces may be assumed to be in normal position and the sliders 110 and 47 will also be in normal position on their resistors.

With the aircraft in a banked attitude therefore, and with the potentiometers 118 and 57 effectively removed the base point of the bridge networks becomes the potentiometer slider 128 in the rudder bridge network and the slider 74 in the aileron bridge network. The means for removing the effect of the potentiometer 118 and 57 is shown in Figure 2. When it is desired that the aircraft be returned to a level or normal flight attitude, the automatic recovery switch 241 is operated to extend a circuit from energized lead 288, lead 308, switch arm 242, through the operating coil 247 of the automatic recovery relay 246 to ground. This relay 246 pulls in and D. C. voltages are extended from lead 288, lead 309, in contact 254, relay arm 249, lead 289, through the main engage relay operating coil 217. The operation of the main engage relay results in the subsequent operation of the rudder and aileron engage relays and their locking themselves in as described. D. C. is also extended from lead 288, lead 293, branch lead 310, relay arm 251, in contact 252, lead 311, through the coil 259 of the locking relay 258 to ground. The relay 258 establishes its own holding circuit from lead 288, lead 312, switch arm 262, in contact 265, coil 259 to ground, and the grounded lead of battery 286.

When relay 258 operates, it opens a circuit for the primary winding 64 of transformer 61 between switch arm 261 and out contact 263 connected to the alternating current source and grounds the primary winding 64 through relay arm 261 and in contact 264 which is connected to ground. The secondary windings 60 and 63 of transformer 61 are no longer energized and thus the centering potentiometers 118 and 57 are rendered ineffective. If the craft be in a banked attitude, a signal will be generated between slider 131 and slider 128 in the rudder bridge network and slider 77 and slider 74 in the aileron bridge network resulting in the return of the craft to an attitude depending upon the adjustment of the automatic recovery sliders 128 and 74. While the operation of the auto recovery switch 241 and the subsequent operation of the relay 246 associates the isolating transformer 266 of the directional gyro rudder potentiometer 37 with the steering motor amplifier 160 by means of lead 290, switch contact 256, switch arm 250, lead 292 yet since the pick-off 37 is being maintained in a no signal position during manual control of the rudder and ailerons there is no signal output from the pick-off 37 causing additional operation of the steering motor amplifier 160. After the 6 or 7 second period of delay by dash pot 244 the auto recovery switch 241 is automatically opened, and the pick-off 37 is isolated from the steering motor amplifier 160 at out contact 231 in the rudder engage relay and at in contact 256 in the auto recovery relay 246 consequently stabilized directional control will be thereafter imposed.

In some instances, it may be desired while in a turn resulting from the displacement of the manually operable slider 153 of potentiometer 154 to utilize the automatic recovery feature. It has been shown that during such manually initiated turns the slider 107 of directional gyroscope potentiometer 108 is displaced with respect to the normal point of resistor 106 and that the normal point of resistor 106 is brought under the slider 107 by the movement of the craft to place pick-off 37 in no signal position even though the control knob 151 may have been placed in normal position. It may be desirable to avoid this movement of the craft required to balance or adjust the pick-off 37 to no signal position and in such instance the auto recovery switch 241 initiates this operation. If the craft is in a turn initiated by the movement of knob 151 as stated, the rudder input circuit of amplifier 140 is balanced by the relative displacements of the sliders 131 and 107 with respect to their resistors 130 and 106. Similarly the aileron amplifier input circuit is balanced by the relative displacement of slider 77 and with respect to its resistor 78 to offset the displacement of slider 39 with respect to its resistor 38. The operation of the auto recovery switch 241 results in the energization of operating coil 247 of relay 246. The operation of the relay 246 results in the operation of locking relay 258 with the consequent grounding of the secondary winding 64 of transformer 61. The grounding of this primary winding 64 renders ineffective the turn potentiometer 154 and the rudder and aileron centering potentiometers 118 and 57. The relay 246 through the arm 250 and in contact 256 associates the isolating transformer 266 of pick-off 37 with the steering motor amplifier 160. The steering motor 167 is operated by the amplifier 160 due to the signal from pick-off 37 and moves this rudder pick-off and aileron pick-off 36 to no signal position.

The vertical gyro 83 has operated sliders 131 and 77 in the rudder and aileron networks. The position of slider 131 with respect to auto recovery potentiometer slider 128 and the position of slider 77 with respect to slider 74 determine the unbalance of the rudder and aileron bridge networks. The aircraft therefore has its rudder and ailerons moved from normal position to remove the bank attitude of the craft and to return it to an attitude which has been preselected by the positioning of sliders 128 and 74. After the brief interval of time the auto recovery switch 241 is automatically opened and directional control from the directional gyro pick-off 37 is again established since the steering motor amplifier 160 has now been isolated from this pick-off. The aircraft has thus been permitted to regain a preselected attitude on a stabilized heading without the aircraft being required to turn through an angle necessary to "wipe out" the signal in the directional gyro rudder potentiometer 37.

It will now be appreciated that there has been provided a novel automatic pilot for an aircraft using as a control element a slaved directional gyro which is provided with an arrangement for rapidly aligning it with a compass and to provide slow precession of the gyroscope after the aligned condition is attained. Further novel combinations of relays and interlocks associated with gyroscope for controlling an aircraft have been described.

While many of the signal pick-offs and other features have been illustrated by electrical constructions it is believed obvious that the broad aspects of this invention are applicable to other types of automatic pilots other than that selected for illustrating the invention. Therefore since many changes could be made in the above construction and many different embodiments of the invention could be made without departing from the scope thereof, it is to be understood that all matter contained in the above description and illustrated in the accompanying drawing shall be interpreted as illustrative only and not as an intention to limit the invention to the specific form disclosed.

I claim as my invention:

1. Control apparatus for a dirigible craft having a control surface and power means normally inoperatively related thereto, said apparatus comprising: a magnetic compass, a directional gyroscope having an electrically driven rotor, electrical torque applying means for precessing said gyroscope, means responsive solely to misalignment of said compass and gyroscope for controlling said torque means, a signal generating means consisting of two relatively adjustable coacting parts, one part being adjusted by said craft, the other part being adjusted by said gyroscope, means for operatively associating said power means with said control surface and controlling said power means from said signal generating means on misalignment of said craft and gyroscope while controlling said torque means by said means responsive to misalignment of said compass and gyroscope and motor means controlled by said signal generating means while said power means is inoperatively related to said control surface for readjusting the relative position of said gyroscope and craft adjusted parts so that said generating means is in a no signal condition when the power means is subsequently operatively associated with said control surface, electric circuit means for energizing said gyroscope rotor and said gyroscope torque applying means including means for momentarily initially decreasing the voltage applied to said rotor driving means while increasing the voltage applied to said torque applying means to more quickly align the gyroscope and compass.

2. Control apparatus for an aircraft comprising: signal providing means including a potentiometer having a slider and a resistor part for producing an alternating voltage of varying magnitude and reversible phase; a gyroscope responsive to change in craft heading; means for stabilizing one potentiometer part by said gyroscope, said other part being carried by said craft; reversible electric power means operatively associable with a control surface of said craft and normally controlled by said potentiometer means; motor means for positioning said other potentiometer part with respect to said craft; selective manual means for associating said power means and said control surface; means for controlling said motor means from said potentiometer means while said power means is operatively disassociated from said control surface; manually operable means for controlling said motor means while said power means is associated with said control surface to effect change in craft heading; and means for initially preventing the operative association of said power means with said control surface by said selective manual means if said manually operable means is displaced from a normal unoperated position.

3. Control apparatus for an aircraft comprising: control signal providing means including a potentiometer having a slider and a resistor part for producing on relative displacement of the slider and resistor midpoint an alternating voltage of varying magnitude and reversible phase; a gyroscope responsive to change in craft heading; means for stabilizing one potentiometer part by said gyroscope, said other part being carried by said craft; reversible electric power means associable with a control surface of said craft and normally controlled by said potentiometer means; motor means for positioning said other potentiometer part with respect to said craft; means for controlling said motor means from said potentiometer means while said power means is operatively disassociated from said control surface to align the slider and resistor midpoint; manually operable means for controlling said motor means while said power means is operatively associated with said control surface; a pair of alternative manually operable switch means for associating said power means with said control surface; and means responsive to operation of one switch means for rendering ineffective the manually operable means.

4. Control apparatus for an aircraft comprising: a power means for controlling said craft about its roll axis; a power means for controlling said craft about its vertical axis; a separate balanceable control system, including a gyroscope operated pick-off, for controlling each power means each pick-off being connected to the same axis of a gyroscope; motor means operatively coupled with both said gyroscope pick-offs; operable switch means for simultaneously disconnecting each said power means from its balanceable control system; and further means connecting a gyroscope pick-off to said motor means for control thereof during the disconnection of the power means to thereby adjust said pick-offs into no signal producing positions to thus align said pick-offs with said gyroscope.

5. The apparatus of claim 4, with a manually operated pick-off for controlling said motor means to provide for operation of both pick-offs and power means to cause banked turns of said craft resulting in changes in position of said craft about said vertical axis, when said balanceable systems are connected to both said power means.

6. Control apparatus for an aircraft having ailerons and rudder control surfaces which may be manually or automatically operated, said apparatus comprising: power means operatively associable with said ailerons; power means operatively associable with said rudder; a vertical gyroscope; a directional gyroscope; a balanceable control means for said aileron power means; a balanceable control means for said rudder power means; each control means including a power means operated pick-off, a craft trim pick-off, a vertical gyro pick-off, and a direction gyro pick-off; motor means drivingly associated with said directional gyro pick-off, means responsive to the unbalance of a control means during manual operation of said surfaces while said corresponding power means is disassociated from its control surface for operating the trim pick-off for rebalancing said control means during changes in craft attitude, and selective manually operable switch means having a delayed release for controlling said motor means momentarily from a said directional gyro pick-off to thereby place said directional gyro pick-off in a normal position, associate both power means with their respective control surfaces and render said trim pick-offs ineffective, to thereby cause said craft to follow the position of the gyroscope pick-offs in the rudder and aileron axes of said craft.

7. In control apparatus for an aircraft in combination: a magnetic compass, a directional gyroscope, precessing means for aligning said compass and gyroscope; a craft heading control pick-off operated upon relative heading movement of said gyroscope and craft; a motor means to drive said pick-off for removing said relative movement, differential means including a second and third pick-off respectively controlled by said compass and gyroscope for operating said precessing means, means for controlling the attitude of said craft from said pick-off while said differential means operates said precessing means; and switch means for initially additionally automatically connecting said craft control pick-off with said motor means for control of said motor an interval after said differential means operates said precessing means to reduce the necessary operation of said motor means to place said craft pick-off in no signal position.

8. In control apparatus for an aircraft in combination: a magnetic compass, a directional gyroscope, precessing means for aligning said compass and gyroscope; a craft heading control pick-off operated upon relative heading movement of said gyroscope and craft; a motor means to drive said pick-off for removing said relative movement, differential means comprising a synchro transmitter and transformer each having a winding fixed to the craft and each having a movable winding one movable winding being positioned by the compass and the other by the gyroscope and responsive to the difference of their positions for operating said precessing means, switch means for automatically connecting said heading control pick-off with said motor means for control of said motor an interval after said differential means operates said precessing means to reduce the necessary operation of said motor means to remove said relative movement; power means for controlling the attitude of said craft about an axis, and selective means for controlling said power means instead of said motor means by said pick-off after said interval.

9. In control apparatus for an aircraft in combination: a magnetic compass, a directional gyroscope, a pair of interconnected synchro generator and control transformer windings fixed to the craft each with a related movable winding, one movable winding positioned by the compass the other by the gyroscope, precessing means connected to the movable transformer winding and controlled therefrom for aligning said compass and gyroscope; a craft heading control pick-off operated upon relative heading movement of said gyroscope and craft; a motor means to drive said pick-off for removing said relative movement, differential means controlled solely by relative displacements of said compass and gyroscope for operating said precessing means, and switch means for automatically connecting said heading control pick-off with said motor means for control of said motor an interval after said differential means operates said precessing means to reduce the necessary operation of said motor means; and means for controlling the relative available precessing effect of said precessing means whereby it is increased during said interval but decreased thereafter.

10. In control apparatus for an aircraft in combination: a magnetic compass, a directional gyroscope, precessing means for aligning said compass and gyroscopes; a craft heading control pick-off operated upon relative heading movement of said gyroscope and craft; a motor means to drive said pick-off for removing said relative movement, differential means having movable elements controlled solely by said compass and gyroscope for operating said precessing means, switch means for automatically connecting said heading control pick-off with said motor means for control of said motor an interval after said differential means operates said precessing means to reduce the necessary operation of said motor means; power means for controlling the attitude of said craft about an axis, selective means for controlling said power means instead of said motor means by said pick-off after said interval; a manually operable pick-off for controlling said motor means while said gyroscope-heading control pick-off controls said power means, to change the heading of said craft; and means responsive during change of heading of said craft to render said precessing means ineffective.

11. In control apparatus for an aircraft in combination: a magnetic compass; a directional gyroscope; precessing means on said gyroscope for aligning said compass and gyroscope; a craft heading control pick-off having two relatively movable parts and connected to be operated upon relative movement of said gyroscope and craft; a motor means adapted to drive one part of said pick-off for removing said relative movement; differential means hav ing movable elements controlled solely by said compass and gyroscope and connected for operating said precessing means; switch means for automatically connecting said heading pick-off with said motor means for control of said motor an interval after said differential means operates said precessing means, to reduce the necessary operation of said motor means; power means for controlling the attitude of said craft about an axis; manually operative selective means for effecting the control of said power means instead of said motor means by said pick-off after said interval; and a manually operable pick-off for controlling said motor means while said heading control pick-off controls said power means, to change the heading of said craft; and means to prevent said selective means from being effective initially until said manually operable pick-off is in a normal unoperated position.

12. Control apparatus for a dirigible craft comprising: a compass responsive to the earth's magnetic field; a directional gyroscope having an electrically driven rotor; means for aligning said gyroscope with said compass, said aligning means including an electrical torque means for precessing said gyroscope about its vertical axis; means for connecting said torque applying means to a power source including alternative circuits one having less resistance than the other and time delay controlled means; said time delay means being effective to complete said one circuit to momentarily increase the voltage applied to said torque applying means and thereafter opening said one circuit to decrease the voltage applied to said torque applying means; and switch means for energizing said rotor and time delay means.

13. Control apparatus for an aircraft comprising: a directional gyroscope; a magnetic compass; precessing means on said gyroscope for aligning said compass and gyroscope; a control signal pick-off operated upon relative heading movement of said gyroscope and craft; a motor means for removing the effect of said movement; differential means having relatively movable elements solely controlled by said compass and gyroscope for supplying control signals when the compass and gyroscope are misaligned; means for connecting said precessing means with said differential means for response thereof to said control signals; power means for controlling the craft heading; switch means; manually operable selective means for operating said switch means for alternatively controlling said power means or said motor means from said gyroscope-craft pick-off; a manually operable pick-off for controlling said motor means while said gyroscope-craft pick-off controls said power means, to change the heading of said craft; and interlock means to prevent operation of said switch means by said selective means until said manually operable pick-off has been initially placed in a normal position.

14. Control apparatus for a dirigible craft comprising: a compass responsive to the earth's magnetic field; a directional gyroscope having an electrically driven rotor; means for aligning said gyroscope with said compass, said aligning means including an electrical torque means on a horizontal axis of said gyroscope for precessing said gyroscope; means for connecting the rotor driving means and torque applying means to a power source; manually operable means for controlling said connections and time delay means responsive to operation of said manual means and connected to energizing circuits for the rotor and torque means and effective to subsequently increase the available voltage applied to said rotor driving means and to subsequently decrease the available voltage applied to said torque applying means.

15. In control apparatus for a dirigible craft; a direction sensitive instrument; a gyroscope having an electrically driven rotor included in a circuit; electrical torque applying means supported on a horizontal axis of said gyroscope for precessing said gyroscope included in a circuit; a thermal actuated device having an energizing circuit, means responsive to misalignment of said sensitive instrument and said gyroscope for controlling said torque applying means circuit; and manually operable means for energizing said circuits, said rotor and torque applying means circuits being additionally controlled by said thermal device for initially momentarily simultaneously increasing the resistance of said rotor circuit while decreasing momentarily the resistance of said torque applying means circuit.

16. Control apparatus for an aircraft having a rudder control surface, said apparatus comprising: an electrical signal generator having a two part pick-off; a gyroscope for stabilizing one part of said pick-off; means for supporting said other pick-off part on said craft; electric power means selectively operatively associated with the control surface and normally controlled by said pick-off; electric motor means for driving said supporting means to zero said pick-off; operable selective switch means having a slow release for inter-connecting said pick-off and motor means when in the operated position for controlling said motor means from said pick-off momentarily to null said pick-off; and further switch means including circuit maintaining means controlled initially by said selective switch means during movement to the operated position for controlling the operative relation of said power means and said surface.

17. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for engaging said pilot with said control surfaces only when said knob is in its inoperative position, and a relay connected with both of said switch means and energized when the pilot is engaged with said control surfaces for maintaining such engagement notwithstanding subsequent operation of the turn knob to its operative position.

18. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for engaging said pilot with said control surfaces only when said knob is in its inoperative position, a relay connected with both of said switch means and energized when the pilot is engaged with said control surfaces for maintaining such engagement notwithstanding subsequent operation of the turn knob to its operative position, and holding means connected to said second switch means and energized by the operation of the second switch means for maintaining the relay energized.

19. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means having an off and an on position interconnected with said first switch means, a selector knob operatively connected to said other switch means for operating said other switch means, and said other switch including means operated by actuation of said selector knob from off to on position for connecting said pilot with a source of current for energizing the electrical components thereof.

20. A manual controller for an aircraft automatic pilot adapted for operative connection to and for operative disconnection from the control surfaces of the craft, comprising a turn knob having an operative and inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for operatively engaging said pilot with said control surfaces only when said knob is in its inoperative position, and a relay connected with both of said switch means and energized when the pilot is operatively engaged with said control surfaces for maintaining such engagement notwithstanding subsequent operation of the turn knob to its operative position.

21. A manual controller for an aircraft automatic pilot adapted for operative connection to and for operative disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for operatively engaging said pilot with said control surfaces only when said knob is in its inoperative position, a relay connected with both of said switch means and energized when the pilot is operatively engaged with said control surfaces for maintaining such engagement notwithstanding subsequent operation of the turn knob to its operative position, and holding means connected to said second switch means and energized by the operation of the second switch means for maintaining the relay energized.

22. A manual controller for an aircraft automatic pilot adapted for operative connection to and for operative disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means having an off and an on position interconnected with said first switch means, a selector knob operatively connected to said other switch means for operating said other switch means, and said other switch including means operated by actuation of said selector knob from an off to an on position for connecting said pilot with a source of current for energizing the electrical components thereof.

References Cited in the file of this patent

UNITED STATES PATENTS

| | | |
|---|---|---|
| 1,982,702 | Sperry | Dec. 4, 1934 |
| 2,126,855 | Wunsch et al. | Aug. 16, 1938 |
| 2,140,191 | Schuchardt et al. | Dec. 13, 1938 |
| 2,357,319 | Esval et al. | Sept. 5, 1944 |
| 2,415,429 | Kellogg et al. | Feb. 11, 1947 |
| 2,429,642 | Newton | Oct. 28, 1947 |
| 2,466,702 | Hamby | Apr. 12, 1949 |
| 2,499,664 | Meredith | Mar. 7, 1950 |
| 2,524,756 | Braddon et al. | Oct. 10, 1950 |
| 2,539,411 | Esval et al. | Jan. 30, 1951 |
| 2,539,482 | Rothschild | Jan. 30, 1951 |
| 2,570,905 | Young et al. | Oct. 9, 1951 |
| 2,589,834 | MacCallum | Mar. 18, 1952 |

FOREIGN PATENTS

| | | |
|---|---|---|
| 871,085 | France | Jan. 3, 1942 |

U. S. DEPARTMENT OF COMMERCE
PATENT OFFICE

CERTIFICATE OF CORRECTION

Patent No. 2,816,722                      December 17, 1957

John W. Anderson

It is hereby certified that error appears in the printed specification of the above numbered patent requiring correction and that the said Letters Patent should read as corrected below.

Column 14, line 75, after "means" insert --operatively--.

Signed and sealed this 4th day of March 1958.

(SEAL)
Attest:
KARL H. AXLINE
Attesting Officer

ROBERT C. ATSON
Commissioner of Patents